United States Patent
Mital et al.

(10) Patent No.: US 10,138,779 B2
(45) Date of Patent: Nov. 27, 2018

(54) SELECTIVE CATALYTIC REDUCTION FILTER DEVICES HAVING $NO_x$ STORAGE CAPABILITIES

(71) Applicant: GM GLOBAL TECHNOLOGY OPERATIONS LLC, Detroit, MI (US)

(72) Inventors: Rahul Mital, Rochester Hills, MI (US); Gongshin Qi, Troy, MI (US); Charles Dean, Clarkston, MI (US); Charles Solbrig, Ypsilanti, MI (US)

( * ) Notice: Subject to any disclaimer, the term of this patent is extended or adjusted under 35 U.S.C. 154(b) by 34 days.

(21) Appl. No.: 15/350,562

(22) Filed: Nov. 14, 2016

(65) Prior Publication Data

US 2018/0135485 A1   May 17, 2018

(51) Int. Cl.
*F01N 3/08* (2006.01)
*B01D 53/94* (2006.01)
(Continued)

(52) U.S. Cl.
CPC ....... *F01N 3/0814* (2013.01); *B01D 53/9418* (2013.01); *B01D 53/9431* (2013.01); *B01D 53/9481* (2013.01); *B01J 23/02* (2013.01); *B01J 23/04* (2013.01); *B01J 23/10* (2013.01); *B01J 23/44* (2013.01); *B01J 29/06* (2013.01); *B01J 29/072* (2013.01); *B01J 29/076* (2013.01); *B01J 35/0006* (2013.01); *B01J 35/04* (2013.01); *F01N 3/0821* (2013.01); *F01N 3/0842* (2013.01); *F01N 3/103* (2013.01); *F01N 3/2066* (2013.01);
(Continued)

(58) Field of Classification Search
None
See application file for complete search history.

(56) References Cited

U.S. PATENT DOCUMENTS 6,753,294 B1 * 6/2004 Brisley .............. B01D 53/9431
                                                    502/439
7,062,904 B1   6/2006 Hu et al.
(Continued)

FOREIGN PATENT DOCUMENTS

DE   102005005663 A1   8/2006
EP        2315924 B1   10/2013

*Primary Examiner* — Walter D. Griffin
*Assistant Examiner* — Jelitza M Perez

(57) ABSTRACT

Selective catalytic reduction filter (SCRF) devices and systems incorporating the same are provided. Systems can include an exhaust gas source, an exhaust gas conduit capable of receiving an exhaust gas stream from the exhaust gas source, and an SCRF device in fluid communication therewith. The SCRF device can include a filter, a selective catalytic reduction (SCR) catalyst disposed on at least portion of the filter, and a $NO_x$ storage coating on at least a portion of the filter. The $NO_x$ storage coating can include one or more of palladium, barium, or cerium. The $NO_x$ storage coating can be biased towards the upstream side of the filter. The $NO_x$ storage coating can overlap a portion of the SCR catalyst. The system can further include a water-absorbing alkali oxide. The water-absorbing alkali oxide can be disposed within the SCRF device, the exhaust gas conduit, or in an upstream oxidation catalyst device.

19 Claims, 2 Drawing Sheets

(51) Int. Cl.
  *B01J 23/44* (2006.01)
  *B01J 23/02* (2006.01)
  *B01J 23/10* (2006.01)
  *B01J 23/04* (2006.01)
  *B01J 29/076* (2006.01)
  *B01J 29/072* (2006.01)
  *B01J 29/06* (2006.01)
  *B01J 35/00* (2006.01)
  *B01J 35/04* (2006.01)
  *F01N 3/10* (2006.01)
  *F01N 3/20* (2006.01)
  *B01D 46/00* (2006.01)

(52) U.S. Cl.
  CPC .. *B01D 46/0027* (2013.01); *B01D 2255/1023* (2013.01); *B01D 2255/2042* (2013.01); *B01D 2255/2065* (2013.01); *B01D 2255/50* (2013.01); *B01D 2279/30* (2013.01); *F01N 2510/063* (2013.01); *F01N 2510/0684* (2013.01); *F01N 2570/14* (2013.01); *F01N 2610/02* (2013.01)

(56) References Cited

U.S. PATENT DOCUMENTS

| | | | | |
|---|---|---|---|---|
| 2003/0196429 | A1* | 10/2003 | Nakatani | F01N 3/0233 60/288 |
| 2007/0110650 | A1* | 5/2007 | Pfeifer | B01D 53/9418 423/213.5 |
| 2010/0319324 | A1* | 12/2010 | Mital | F01N 3/021 60/286 |
| 2017/0107878 | A1* | 4/2017 | Brown | F01N 3/20 |

* cited by examiner

SELECTIVE CATALYTIC REDUCTION FILTER DEVICES HAVING $NO_x$ STORAGE CAPABILITIES

INTRODUCTION

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons, oxides of nitrogen ($NO_x$), and oxides of sulfur ($SO_x$), as well as condensed phase materials (liquids and solids) that constitute particulate matter. Liquids can include water and hydrocarbons, for example.

Exhaust gas treatment systems may employ catalysts in one or more components configured for accomplishing an after-treatment process such as reducing $NO_x$ to produce more tolerable exhaust constituents of nitrogen ($N_2$) and water ($H_2O$). One type of exhaust treatment technology for reducing $NO_x$ emissions is a selective catalytic reduction (SCR) device, which generally includes a substrate or support with a catalyst compound disposed thereon. Passing exhaust over the catalyst converts certain or all exhaust constituents in desired compounds, such as non-regulated exhaust gas components. A reductant is typically sprayed into hot exhaust gases upstream of the SCR, decomposed into ammonia, and absorbed by the SCR device. The ammonia then reduces the $NO_x$ to nitrogen and water in the presence of the SCR catalyst.

A particulate filter (PF) located upstream and/or downstream the SCR can be utilized to capture soot, and that soot may be periodically incinerated during regeneration cycles. Water vapor, nitrogen and reduced emissions thereafter exit the exhaust system. A PF and SCR can be integrated as a selective catalytic reduction filter (SCRF).

SUMMARY

According to an aspect of an exemplary embodiment, a selective catalytic reduction filter (SCRF) device is provided. The SCRF device can include a filter having an upstream side and a downstream side, a selective catalytic reduction (SCR) catalyst disposed on at least portion of the filter, and a $NO_x$ storage coating on at least a portion of the filter. The $NO_x$ storage coating can include one or more of palladium, barium, or cerium. The $NO_x$ storage coating can be biased towards the upstream side of the filter. The NOx storage coating can overlap a portion of the SCR catalyst. The SCRF can further include a water-absorbing alkali oxide.

According to another aspect of an exemplary embodiment, an exhaust gas treatment system is provided wherein the system includes an exhaust gas source, an exhaust gas conduit capable of receiving an exhaust gas stream from the exhaust gas source, an oxidation catalyst device in fluid communication with the exhaust gas conduit, a SCRF device in fluid communication with the exhaust gas conduit and disposed downstream relative to the oxidation catalyst device, wherein the SCRF device includes a filter having an upstream side and a downstream side, a SCR catalyst disposed on at least a portion of the filter, and a NOx storage coating on at least a portion of the filter. The $NO_x$ storage coating can include one or more of palladium or cerium. The oxidation catalyst device can include a water-absorbing alkali oxide. The exhaust gas source can include an internal combustion engine, and can power a vehicle.

According to another aspect of an exemplary embodiment, an exhaust gas treatment system is provided wherein the system includes an exhaust gas source, an exhaust gas conduit capable of receiving an exhaust gas stream from the exhaust gas source, a SCRF device in fluid communication with the exhaust gas conduit and disposed downstream relative to the oxidation catalyst device, wherein the selective catalytic reduction device includes a filter having an upstream side and a downstream side, a SCR catalyst disposed on a portion of the filter, and a $NO_x$ storage coating on at least a portion of the filter, and a water-absorbing alkali oxide disposed upstream from the downstream end of the SCRF device filter. The exhaust gas treatment system can further include an oxidation catalyst device having a catalytically active material in fluid communication with the exhaust gas conduit and disposed upstream from the SCRF device, and at least a portion of the water-absorbing alkali oxide can be disposed within the oxidation catalyst device. The exhaust gas treatment system can further include a selective catalytic reduction device in fluid communication with the SCRF device and disposed downstream therefrom. The exhaust gas source can include an internal combustion engine, and can power a vehicle.

Although many of the embodiments herein are described in relation to $NO_x$ storage in vehicular exhaust gas treatment systems, the embodiments herein are generally suitable for $NO_x$ storage in various unrelated applications.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Generally, this disclosure pertains to $NO_x$ storage materials, devices, and systems. In particular, this disclosure pertains to selective catalytic reduction filter (SCRF) devices having $NO_x$ storage capabilities, wherein the SCRF devices are configured to receive exhaust gas streams from an exhaust gas source. Exhaust gas streams are generated, in some embodiments, by internal combustion engines (ICE) which can, for example, power a vehicle. As used herein, "$NO_x$" refers to one or more nitrogen oxides. $NO_x$ species can include $N_yO_x$ species, wherein y>0 and x>0. Non-limiting examples of nitrogen oxides can include $NO$, $NO_2$, $N_2O$, $N_2O_2$, $N_2O_3$, $N_2O_4$, and $N_2O_5$.

Figure 1:
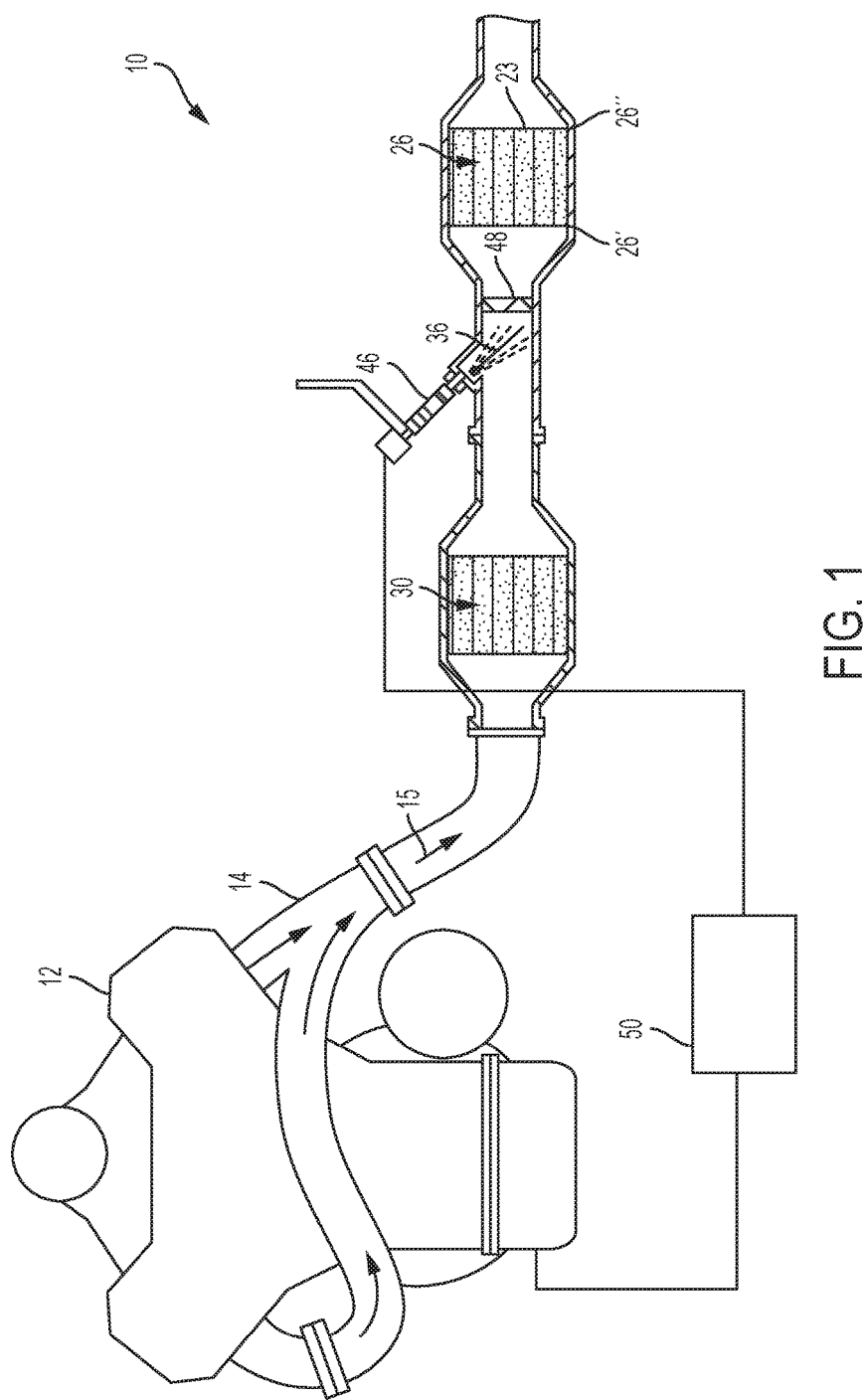
FIG. 1 illustrates an schematic view of an exhaust gas treatment system, according to one or more embodiments.

FIG. 1 illustrates an exhaust gas treatment system 10 for treating and/or monitoring the exhaust gas 15 constituents of an ICE 12. The exhaust gas treatment system 10 described herein can be implemented in various ICE systems that can include, but are not limited to, diesel engine systems, gasoline direct injection systems, and homogeneous charge compression ignition engine systems. The ICEs will be described herein for use in generating torque for vehicles, yet other non-vehicular applications are within the scope of this disclosure. Therefore when reference is made to a vehicle, such disclosure should be interpreted as applicable to any application of an ICE. Moreover, ICE 12 can generally represent any device capable of generating an exhaust gas stream 15 comprising gaseous (e.g., $NO_x$, $O_2$), carbonaceous, and/or particulate matter species, and the disclosure herein should accordingly be interpreted as applicable to all such devices. It should be further understood that the embodiments disclosed herein may be applicable to treatment of effluent streams not comprising carbonaceous and/or particulate matter species, and, in such instances, ICE 12 can also generally represent any device capable of generating an effluent stream comprising such species. For Example, ICE 12 can include a plurality of reciprocating pistons (not shown) attached to a crankshaft (not shown), which may be operably attached to a driveline, such as a vehicle driveline (not shown), to deliver tractive torque to the driveline. For example, ICE 12 can be any engine configuration or application, including various vehicular applications (e.g., automotive, marine and the like), as well as various non-vehicular applications (e.g., pumps, generators and the like).

The exhaust gas treatment system 10 generally includes one or more exhaust gas conduits 14, and one or more exhaust treatment devices. The exhaust gas conduit 14, which can comprise several segments, transports exhaust gas 15 from the ICE 12 to the various exhaust treatment devices of the exhaust gas treatment system 10. In some exemplary embodiments, exhaust gas 15 can comprise $NO_x$ species.

In the embodiment as illustrated, the exhaust gas treatment system 10 devices includes an optional oxidation catalyst (OC) device 30, and a selective catalytic reduction (SCR) device 26. The OC device 30 and a selective catalytic reduction (SCR) device 26 can be downstream from a turbocharger (not shown) in some embodiments. SCR devices can include SCRF devices, as will be described below. Upstream and downstream are defined in relation to the direction of the flow of exhaust gas 15 from ICE 12. As shown in FIG. 1, SCR device 26 includes an upstream side 26' and a downstream side 26".

As can be appreciated, the exhaust gas treatment system 10 of the present disclosure can include various combinations of one or more of the exhaust treatment devices shown in FIG. 1A, and/or other exhaust treatment devices (not shown), and is not limited to the present example. Exhaust gas treatment system 10 can further include a control module 50 operably connected via a number of sensors to monitor the engine 12 and/or the exhaust gas treatment system 10.

Control module 50 can be operably connected to the engine 12 and/or various exhaust gas treatment system 10 components. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. The control module 50 can be operably connected to the exhaust treatment devices described above, including OC device 30, SCRF device 26, and one or more gas sensors (not shown) and/or temperature sensors (not shown), for example.

The OC device 30 can be positioned upstream from the SCRF device 26, and can include a flow-through metal or ceramic monolith substrate packaged in shell or canister. The shell or canister includes an inlet and an outlet in fluid communication with exhaust gas conduit 14, and can ideally comprise a substantially inert material, relative to the exhaust gas constituents, such as stainless steel. The substrate can include an oxidation catalyst compound disposed thereon. The oxidation catalyst compound can be applied as a wash coat and can contain platinum group metals such as platinum (Pt), palladium (Pd), rhodium (Rh) or other metal oxide catalysts, and combinations thereof. Metal oxide catalyst can include iron oxides, zinc oxides, perovksites, and combination thereof, for example. The OC device 30 is useful in treating unburned gaseous and non-volatile unburned hydrocarbons and CO, which are oxidized to form carbon dioxide and water.

OC devices are generally positioned upstream from SCR and SCRF devices to serve several catalytic functions. When PF device and SCRF devices become clogged with particulate matter (e.g., soot) and require high temperature regeneration, the OC device is utilized for after-injection regeneration. After-injection regeneration strategies manipulate engine calibrations such that fuel after-injected into the engine cylinders is expelled into the exhaust system uncombusted. When the after-injected fuel contacts the OC device, such as OC device 30, heat released during oxidation of the fuel is imparted to the exhaust gas treatment system 10 to clear the SCRF device 26 of some or all accumulated particulate matter. Secondly, OC devices convert NO into $NO_2$, which is more efficiently and preferentially reduced into desired species by the downstream SCR device, such as SCRF device 26.

In general, the SCR device 26 includes all devices which utilize a reductant 36 and a catalyst to NO and $NO_2$ to harmless components. The SCR device 26 can include, for example, a flow-through ceramic or metal monolith substrate that can be packaged in a shell or canister having an inlet and an outlet in fluid communication with the exhaust gas conduit 14 and optionally other exhaust treatment devices. The shell or canister can ideally comprise a substantially inert material, relative to the exhaust gas constituents, such as stainless steel. The substrate can include a SCR catalyst composition applied thereto.

The substrate body can, for example, be a ceramic brick, a plate structure, or any other suitable structure such as a monolithic honeycomb structure that includes several hundred to several thousand parallel flow-through cells per square inch, although other configurations are suitable. Each of the flow-through cells can be defined by a wall surface on which the SCR catalyst composition can be washcoated. The substrate body can be formed from a material capable of withstanding the temperatures and chemical environment associated with the exhaust gas 15. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating $TiO_2$ material, for example. The substrate body can be a PF device, as will be discussed below.

The SCR catalyst composition is generally a porous and high surface area material which can operate efficiently to convert $NO_x$ constituents in the exhaust gas 15 in the presence of a reductant 36, such as ammonia. For example, the catalyst composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalyst composition can contain a zeolite impregnated with one or more of copper, iron, or vanadium. In some embodiments the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable SCR catalyst compositions can have high thermal structural stability, particularly when used in tandem with particulate filter (PF) devices or when incorporated into SCRF devices, described below, which are regenerated via high temperature exhaust soot burning techniques.

The SCR catalyst composition can optionally further comprise one or more base metal oxides as promoters to further decrease the $SO_3$ formation and to extend catalyst life. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

The SCR device 26 generally uses a reductant 36 to reduce $NO_x$ species (e.g., NO and $NO_2$) to harmless components. Harmless components include one or more of species which are not $NO_x$ species, such as diatomic nitrogen, nitrogen-containing inert species, or species which are considered acceptable emissions, for example. The reductant 36 can be ammonia ($NH_3$), such as anhydrous ammonia or aqueous ammonia, or generated from a nitrogen and hydrogen rich substance such as urea ($CO(NH_2)_2$). Additionally or alternatively, the reductant 36 can be any compound capable of decomposing or reacting in the presence of exhaust gas 15 and/or heat to form ammonia. Equations (1)-(5) provide exemplary chemical reactions for $NO_x$ reduction involving ammonia.

$$6NO + 4NH_3 \rightarrow 5N_2 + 6H_2O \tag{1}$$

$$4NO + 4NH_3 + O_2 \rightarrow 4N_2 + 6H_2O \tag{2}$$

$$6NO_2 + 8NH_3 \rightarrow 7N_2 + 12H_2O \tag{3}$$

$$2NO_2 + 4NH_3 + O_2 \rightarrow 3N_2 + 6H_2O \tag{4}$$

$$NO + NO_2 + 2NH_3 \rightarrow 2N_2 + 3H_2O \tag{5}$$

It should be appreciated that Equations (1)-(5) are merely illustrative, and are not meant to confine the SCR device 26 to a particular $NO_x$ reduction mechanism or mechanisms, nor preclude the operation of other mechanisms. The SCR device 26 can be configured to perform any one of the above $NO_x$ reduction reactions, combinations of the above $NO_x$ reduction reactions, and other $NO_x$ reduction reactions.

The reductant 36 can be diluted with water in various implementations. In implementations where the reductant 36 is diluted with water, heat (e.g., from the exhaust) evaporates the water, and ammonia is supplied to the SCR device 26. Non-ammonia reductants can be used as a full or partial alternative to ammonia as desired. In implementations where the reductant 36 includes urea, the urea reacts with the exhaust to produce ammonia, and ammonia is supplied to the SCR device 26. The SCR device 26 can store (i.e., absorb, and/or adsorb) ammonia supplied by the reductant 36 for interaction with exhaust gas 15. Reaction (6) below provides an exemplary chemical reaction of ammonia production via urea decomposition.

$$CO(NH_2)_2 + H_2O \rightarrow 2NH_3 + CO_2 \tag{6}$$

It should be appreciated that Equation (6) is merely illustrative, and is not meant to confine the urea or other reductant 36 decomposition to a particular single mechanism, nor preclude the operation of other mechanisms.

A reductant 36 can be supplied from a reductant supply source (not shown) and injected into the exhaust gas conduit 14 at a location upstream of the SCR device 26 using an injector 46, or other suitable method of delivery of the reductant 36 to the exhaust gas 15. The reductant 36 can be in the form of a gas, a liquid, or an aqueous solution, such as an aqueous urea solution. The reductant 36 can be mixed with air in the injector 46 to aid in the dispersion of the injected spray. A mixer or turbulator 48 can also be disposed within the exhaust conduit 14 in close proximity to the injector 46 to further assist in thorough mixing of the reductant 36 with the exhaust gas 15 and/or even distribution throughout the SCR device 26.

Figure 2:
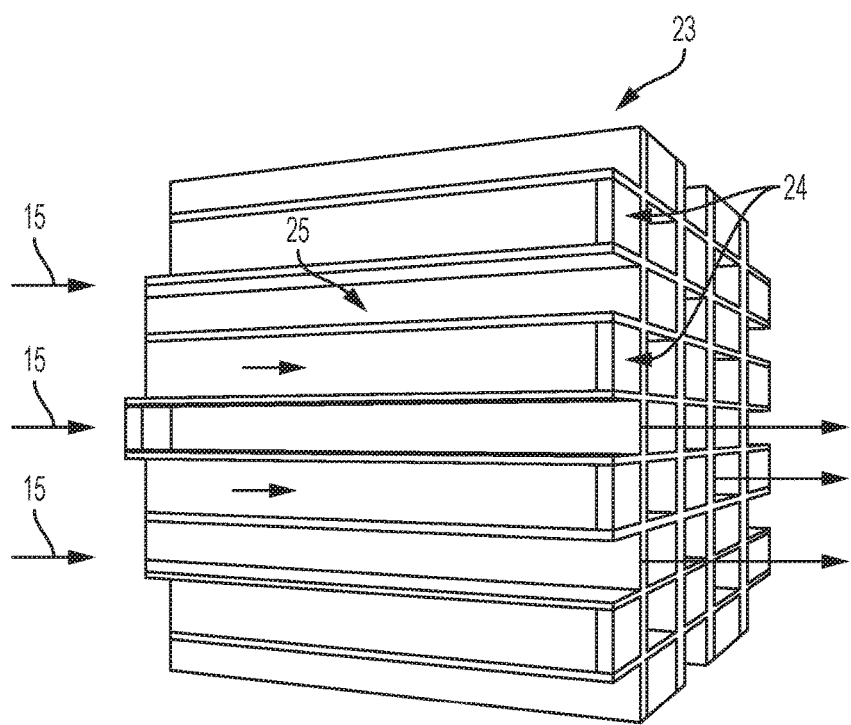
FIG. 2 illustrates a perspective view of a particulate filter, according to one or more embodiments.

One example of an exhaust gas treatment device is a PF device. A PF device can be disposed downstream of the OC device 30 and upstream of a SCR device 26, or can be disposed downstream of the SCR device 26. A PF device generally operates to filter the exhaust gas 15 of carbon, soot, and other particulates. A PF device can include a filter 23, as shown in FIG. 2. The filter 23 can be a ceramic or SiC wall flow monolith filter that can be packaged in a shell or canister having an inlet and an outlet in fluid communication with exhaust gas conduit 14. The shell or canister can ideally comprise a substantially inert material, relative to the exhaust gas constituents, such as stainless steel. It is appreciated that the ceramic or SiC wall flow monolith filter is merely exemplary in nature and that the PF device can include other filter devices such as wound or packed fiber filters, open cell foams, sintered metal fibers, etc. The filter 23 can have a plurality of longitudinally extending passages 24 and 25 that are defined by longitudinally extending walls. The passages include a subset of inlet passages 24 that have an open inlet end and a closed outlet end, and a subset of outlet passages 25 that have a closed inlet end and an open outlet end. Exhaust gas 15 entering the filter 23 through the inlet ends of the inlet passages 24 is forced to migrate through adjacent longitudinally extending walls to the outlet passages 25. It is through this wall flow mechanism that the exhaust gas 15 is filtered of carbon and other particulates.

One example of an exhaust gas treatment device is an SCRF device, which combines the features of SCR devices and PF devices into a single device. In FIG. 1, SCR device 26 is shown having a PF filter 23 and accordingly comprises an SCRF device 26. SCRF device 26 comprises PF filter 23 coated with an active catalytic component, such as the SCR catalytic components described above. The catalytic component can be applied as a washcoat to the inner walls of inlet passages 24 of the filter, outlet passages 25 of the filter, or both. Generally the washcoat can be applied in an amount of about 60 g to about 180 g of washcoat per liter of SCRF device 26 volume, although other amounts of practicable. In some embodiments, the washcoat can be applied in a thickness of about 15 μm to about 50 μm. During operation, SCRF device 26 accumulates particulate matter within the passage 24, and occasionally within passage 25, and reductant 36 becomes generally disposed on the catalytic component such as through adsorption and/or absorption, for interaction with exhaust gas 15. It should be understood that the description provided of SCRF device 26 is not meant to restrict the definition of a SCRF device, nor preclude the use of various additional or alternative SCRF designs in conjunction with the embodiments described herein.

Most SCR $NO_x$ reduction catalysts have light-off temperatures of about 200° C., where the catalytic element has high $NO_x$ storage and conversion capabilities. Undesired $NO_x$ slip can occur when $NO_x$ passes through the SCRF device 26, particularly when the SCR catalyst has not achieved its light-off temperature. Accordingly, $NO_x$ slip can be particularly problematic during engine startup and in cold conditions. $NO_x$ slip can also be exacerbated by lean burn strategies commonly implemented in diesel engines, for example. Lean burn strategies coordinate combustion at higher than stoichiometric air to fuel mass ratios to improve fuel economy, and produce hot exhaust with a relatively high content of O2 and $NO_x$ species. The high O2 content can further inhibit or prevent the reduction of $NO_x$ species in some scenarios.

Provided herein are SCRF devices, such as SCRF device 26, having $NO_x$ storage capabilities configured to prevent or minimize $NO_x$ slip during operating periods in which $NO_x$ reduction is unfeasible or inefficient. In particular, the SCRF devices have high $NO_x$ storage capabilities at temperatures before the SCRF device light-off temperature. The below $NO_x$ storage concepts will described in relation to exhaust gas system 10 for the purpose of illustration only, and one of skill in the art will recognize such illustrations as being non-limiting. In one embodiment, an SCRF device 26, having an upstream side 26' and a downstream side 26", includes a filter 23, and an SCR catalyst, such as those described above. The SCR catalyst can be coated or otherwise disposed on at least a portion of the filter 23 in some embodiments. The SCRF device 26 further comprises a $NO_x$ storage coating disposed on at least a portion of the filter. The $NO_x$ storage coating can be applied in an amount of about 1 g/L to about 20 g/L, wherein g/L refers to grams of $NO_x$ storage metal (e.g., Pd) per liter of volume within the SCRF device 26. The volume of the SCRF device 26 can be defined by its canister or shell, for example. The $NO_x$ storage coating can comprise one or more metals such as palladium, barium, and cerium, in some embodiments. The palladium can be at least partially present as an oxide, for example. The cerium can be at least partially present as an oxide, for example. The barium can be at least partially present as an oxide, for example. The $NO_x$ storage metal can be impregnated in a zeolite and applied as a washcoat to the filter 23 and/or the SCR catalyst. Suitable zeolites include those described above. In one embodiment the zeolite comprises Chabazite. In some embodiments the $NO_x$ storage coating is platinum-free. The $NO_x$ storage coating is platinum-free in some embodiments because platinum will oxidize ammonia to $NO_x$ species. For example, Equation (7) provides an example mechanism by which ammonia is oxidized to NO over a platinum catalyst.

$$4NH_3 + 5O_2 \rightarrow 4NO + 6H_2O \qquad (7)$$

The $NO_x$ storage coating can be applied as a washcoat, for example. In some embodiments the $NO_x$ storage coating overlaps the SCR catalyst. In such embodiments, the $NO_x$ storage coating does not inhibit or substantially inhibit the operation of the SCR catalyst. In some embodiments, the SCR catalyst and the $NO_x$ storage coating are applied as a single coating to the filter 23.

The $NO_x$ storage coating can be biased towards to the upstream side 26' of the SCRF device 26. An upstream-biased coating can include a greater amount of $NO_x$ storage coating on the filter 23 and/or SCR catalyst near the upstream side 26' relative to the downstream side 26". For example, up to about 10%, up to about 20%, up to about 30%, up to about 40%, or up to about 50% of the SCRF device 26 length, measured from the upstream side 26', can be coated with the $NO_x$ storage coating. An upstream-biased coating can include a portion of the filter 23 and/or SCR catalyst proximate the downstream side 26" which includes no $NO_x$ storage coating. An upstream-biased coating can include a $NO_x$ storage coating thickness which decreases from the upstream side 26' to the downstream side 26" of the SCRF device 26. An upstream-biased coating provides more opportunity for de-sorbed NOx to interact with the SCR catalyst before exiting the downstream side 26" of the SCRF device 26. However in some embodiments the $NO_x$ storage coating can cover the entire filter 38, be downstream-biased, or not comprise an upstream-biased coating. In such embodiments, as second SCR device (not shown) can optionally be disposed downstream from the SCRF device 26 to ensure that any $NO_x$ slip is mitigated. Such mitigation can include reduction or storage of the $NO_x$ species by the second SCR device, for example.

$NO_x$ storage can be inhibited by the presence of water. Accordingly, presented herein are hygroscopic (i.e., water-absorbing) materials, and exhaust gas treatment systems incorporating the same. Water-absorbing materials include one or more alkali oxides. The one or more alkali oxides can comprise sodium, potassium, and lithium. The water water-absorbing materials can be deposited as a washcoat, for example.

The water-absorbing materials can be disposed upstream from the SCRF device 26. In some embodiments, the water-absorbing materials can be disposed upstream from the SCRF device 26 and downstream from the reductant injector 46. In some embodiments, the water-absorbing materials can be disposed upstream from both the SCRF device 26 and the reductant injector 46. In some embodiments, the water-absorbing materials can be disposed within the OC device 30, within the exhaust gas conduit 14, and combinations thereof. The water-absorbing alkali oxide can be applied in an amount of about 5 g/L to about 50 g/L, wherein g/L refers to grams of elemental alkali (e.g., Na) per liter of volume within the OC device 30. The volume of the OC device 30 can be defined by its canister or shell, for example. In embodiments where the water-absorbing materials are disposed within the OC device 30, and the water-absorbing materials comprise alkali oxides, the alkali oxides can be deposited in a zone within the OC device 30 which does not include any OC washcoat.

Additionally or alternatively, the water-absorbing materials can be disposed within the SCRF device 26. Disposition of the water-absorbing materials within the SCRF device 26 can be particularly suitable when the reductant 36 utilized in operation of the SCRF device 26 comprises water (e.g., an aqueous urea solution), because the water can inhibit $NO_x$ storage within the SCRF device 26. The water-absorbing materials within the SCRF device 26 can be upstream-biased, downstream-biased, or evenly distributed, for example. In one embodiment, an SCRF device 26 includes a filter 23 having SCR catalyst generally disposed thereon, a $NO_x$ storage coating disposed on the SCR catalyst and/or filter 23 with an upstream bias, and a water-absorbing material coating disposed on the SCR catalyst and/or filter 23 and/or SCR catalyst with an upstream bias relative to the SCR catalyst coating. In such an example, the SCR catalyst can cover at least about 90%, at least about 95%, or at least about 97.5% of the filter 23, the $NO_x$ storage coating can be disposed within at least about 40%, at least about 50%, or at least about 60% of the SCRF device 26 upstream side, and the water-absorbing material coating can be disposed within about 20%, about 25%, or about 30% of the SCRF device 26 upstream side, wherein percentages refer to the linear length of the SCRF device 26 relative to the flow of exhaust gas 15.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An exhaust gas treatment system, the system comprising:
    an exhaust gas source;
    an exhaust gas conduit capable of receiving an exhaust gas stream from the exhaust gas source;
    an oxidation catalyst device in fluid communication with the exhaust gas conduit, wherein the oxidation catalyst device includes a water-absorbing alkali oxide; and
    a selective catalytic reduction filter (SCRF) device in fluid communication with the exhaust gas conduit and disposed downstream relative to the oxidation catalyst device, wherein the SCRF device includes:
    a filter having an upstream side and a downstream side,
        a selective catalytic reduction (SCR) catalyst disposed on at least a portion of the filter, and
        a NOx storage coating on at least a portion of the filter.

2. The exhaust gas treatment system of claim 1, wherein the water-absorbing alkali oxide comprises one or more of lithium, potassium, or sodium.

3. The exhaust gas treatment system of claim 1, wherein the NOx storage coating comprises one or more of palladium, barium, and cerium.

4. The exhaust gas treatment system of claim 3, wherein the one or more of palladium, barium, and cerium are present at least partially as an oxide.

5. An exhaust gas treatment system, the system comprising:
    an exhaust gas source;
    an exhaust gas conduit capable of receiving an exhaust gas stream from the exhaust gas source;
    a selective catalytic reduction filter (SCRF) device in fluid communication with the exhaust gas conduit and disposed downstream relative to the exhaust gas source, wherein the SCRF device includes:
    a filter having an upstream side and a downstream side,
        a selective catalytic reduction (SCR) catalyst disposed on a portion of the filter, and
        a NOx storage coating on at least a portion of the filter; and
    a water-absorbing alkali oxide disposed upstream from the SCRF device.

6. The exhaust gas treatment system of claim 5, further comprising an oxidation catalyst device having a catalytically active material in fluid communication with the exhaust gas conduit and disposed upstream from the SCRF device, wherein at least a portion of the water-absorbing alkali oxide is disposed within the oxidation catalyst device.

7. The exhaust gas treatment system of claim 6, wherein the water-absorbing alkali oxide is deposited on at least a portion of the catalytically active material.

8. The exhaust gas treatment system of claim 7, further comprising a selective catalytic reduction device in fluid communication with the SCRF device and disposed downstream therefrom.

9. The exhaust gas treatment system of claim 5, further comprising an oxidation catalyst device which includes the water-absorbing alkali oxide.

10. The exhaust gas treatment system of claim 5, wherein the NOx storage coating comprises one or more of palladium, barium, and cerium.

11. The exhaust gas treatment system of claim 1, wherein the NOx storage coating is biased towards to the upstream side of the filter.

12. The exhaust gas treatment system of claim 1, wherein the NOx storage coating overlaps at least a portion of the SCR catalyst.

13. The exhaust gas treatment system of claim 1, wherein the SCR catalyst comprises a metal impregnated zeolite.

14. The exhaust gas treatment system of claim 13, wherein the metal impregnated zeolite comprises one or more of iron, cobalt, copper, vanadium, sodium, barium, titanium, tungsten, and copper.

15. The exhaust gas treatment system of claim 5, wherein the NOx storage coating is biased towards to the upstream side of the filter.

16. The exhaust gas treatment system of claim 5, wherein the NOx storage coating overlaps at least a portion of the SCR catalyst.

17. The exhaust gas treatment system of claim 5, wherein the SCR catalyst comprises a metal impregnated zeolite.

18. The exhaust gas treatment system of claim 17, wherein the metal impregnated zeolite comprises one or more of iron, cobalt, copper, vanadium, sodium, barium, titanium, tungsten, and copper.

19. The exhaust gas treatment system of claim 10, wherein the one or more of palladium, barium, and cerium are present at least partially as an oxide.

* * * * *